UNITED STATES PATENT OFFICE.

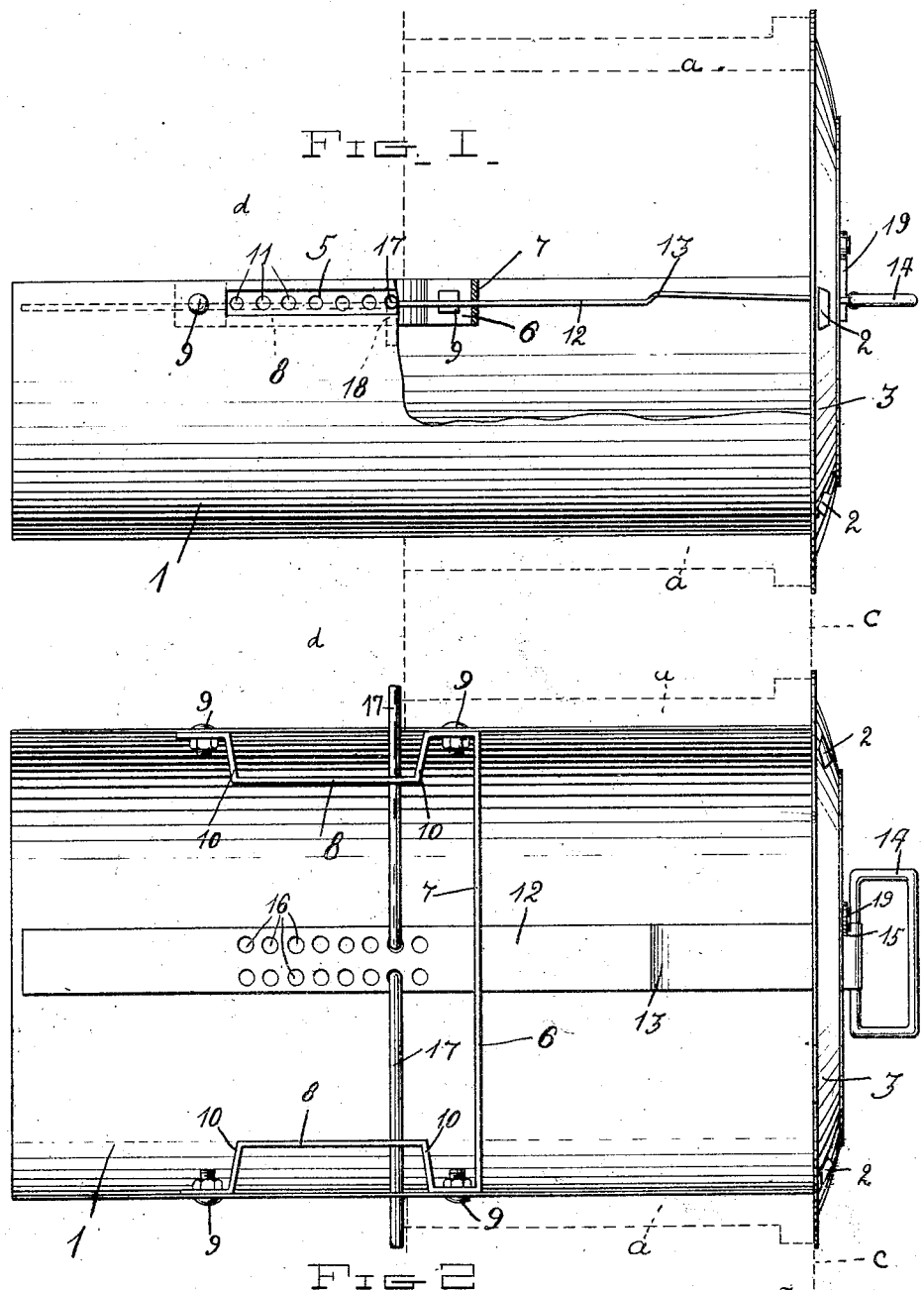

ARNEST E. GOWIN, OF MORRISONVILLE, ILLINOIS.

FLUE-STOP.

No. 874,672.

Specification of Letters Patent.

Patented Dec. 24, 1907.

Application filed February 21, 1907. Serial No. 358,740.

*To all whom it may concern:*

Be it known that I, ARNEST E. GOWIN, a citizen of the United States, residing at Morrisonville, in the county of Christian and State of Illinois, have invented certain new and useful Improvements in Flue-Stops; and I do declare the following to be a full, clear, and exact description of the invention, such as will enable others skilled in the art to which it appertains to make and use the same.

My invention is a combined flue stop and soot collector and remover adapted for use in closing the stove pipe hole at the outer end of a thimble and also for use in collecting the soot which accumulates in the thimble and flue and to enable said soot to be removed from the thimble and flue by simply withdrawing the said flue stop therefrom, and it consists in the construction, combination, and arrangement of devices hereinafter described and claimed.

In the accompanying drawings, Figure 1 is partly a side elevation and partly a sectional view of a flue stop embodying my improvements; and Fig. 2 is a top plan view of the same.

In accordance with my invention, I provide a scoop element 1, which is here shown as semi-cylindrical in form and adapted to fit in the lower side of a thimble $a$, extend longitudinally through the thimble and project into the flue $d$ in rear of the thimble. The said scoop is made of suitable sheet metal and is provided at its front end with ears 2, which are passed through openings in the plate or disk 3, which closes the outer end of the thimble and bears against the wall $c$. The said ears are bent against the outer side of the said plate or disk to secure the scoop or thimble-entering element to the said plate and may also be soldered thereto. In the sides of the said scoop, near its upper edges are longitudinal openings or slots 5, which extend in rear of the thimble. In the said scoop is placed a frame 6, which is made preferably from a single strip of sheet metal bent to form a cross bar to extend across the scoop and longitudinally-disposed arms 8 to extend in opposite sides of the scoop, and which are here shown as detachably secured to the sides of the scoop by means of fastenings 9. The said arms have those portions which are opposite the openings 5, inset laterally, as at 10, and provided with series of adjusting openings 11, the said openings 11 being opposite the openings 5.

A longitudinally-movable bar 12 operates and is guided in central openings in the cross bar 7 of the frame and in the closure disk or plate. The said bar is provided at a suitable distance from its front end with a stop shoulder 13, has a bail or ring 14 at its front end and is also provided near its front end with a notch 15. The said bar is provided at a suitable point with longitudinally-disposed series of adjusting openings 16. I also provide locking bolts 17, which are here shown as made of wire of suitable gage. The inner ends of the said locking bolts are down-turned to form arms 18 to enter appropriate openings 16 in the bar 15 to pivotally and adjustably connect said locking bolts to said bar, and the outer portions of said locking bolts pass through appropriate openings in the inset portions of the arms 8, and are hence adapted to project outwardly through the openings 5 in the scoop element.

When the bar 12 is drawn forwardly, it causes the locking bolts to turn angularly, so that their outer ends are drawn through the openings 5 and are disposed within the scoop element, so that the outer side thereof is unobstructed and the said scoop or thimble-entering element may be readily placed in the thimble. The bar 12 is then moved in the opposite direction to cause the locking bolts to assume a position at substantially right angles with reference thereto and hence the outer ends of said locking bolts are projected beyond the sides of the thimble and engage the inner end thereof or the inner side of the flue and thereby secure the flue stop in place with its closure plate or disk bearing against the wall and the inner end of the scoop or thimble-entering element extended into the flue, in such manner that it will collect the soot which usually accumulates in the thimble. When the locking bolts and bar 12 are in this position, said bar 12 is locked by a button or other suitable latch member 19, which is here shown as pivoted on the closure disk or plate and is adapted to engage the notch near the outer end of said bar. The stop 15 of said bar by coacting with the disk or plate serves to limit the outer movement of said bar. It will be understood that before placing the flue stop in the thimble, the locking bolts will be appropriately adjusted with reference to the bar or scoop according to the length of the thimble, so that when the bar 12 and the locking bolts are in the locking position hereinbefore stated, said bolts will engage the inner end of the thimble or inner side of the flue.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claims.

Having thus described my invention, what I claim as new, and desire to secure by Letters-Patent, is,—

1. In a device of the class described, a scoop designed for entrance into a flue opening, a cap plate attached to the outer end of the scoop for closing said flue opening, a longitudinally slidable bar sustained in the scoop and projecting through cap plate, bearing arms attached to the inner faces of the scoop and each provided with a plurality of perforations, the side walls of the scoop having longitudinal slots arranged opposite said perforations and locking bolts pivotally connected at their inner ends with the bar and arranged for their outer ends to project outwardly through the perforated bearing arms and slots.

2. In a device of the class described, a scoop designed for entrance into a flue opening and having one of its side walls provided with a longitudinal slot, a bearing arm attached to the inner face of the scoop and having a perforation disposed coincident with said slot, a cap plate attached to the outer end of the scoop for closing the flue opening, a longitudinally slidable bar sustained in the scoop and projecting outward through said plate and a locking bolt pivotally connected at its inner end with the bar and having its outer end arranged to project outwardly through the perforated bearing arm and slot.

In testimony whereof I have hereunto set my hand in presence of two subscribing witnesses.

ARNEST E. GOWIN.

Witnesses:
LEROY MARTIN,
WILLIAM E. JOHNSON.